Patented Feb. 17, 1948

2,436,146

UNITED STATES PATENT OFFICE 2,436,146

COMPOSITION OF MATTER

Werner E. Kleinicke, Manhasset, N. Y., assignor to The Johnson-March Corporation, New York, N. Y., a corporation of Delaware No Drawing. Application March 12, 1943, Serial No. 478,941

10 Claims. (Cl. 252—88)

This invention relates to a new composition of matter.

The new composition in accordance with this invention is adapted for various use advantageously in the commercial arts. Thus, by way of example, the new composition in accordance with this invention lends itself admirably to use in the treatment of coal for rendering it dustproof, for use in soil stabilization in connection with the construction of roadways, and the like, and to various other uses.

The new composition in accordance with this invention from the broad standpoint will comprise a hygroscopic, non-deliquescent, normally solid, organic colloid capable of forming a gel with water, in finely divided form, and a water-soluble, deliquescent, crystallizable salt capable of lowering substantially the freezing point of water. The organic colloid will be in minor proportion with respect to the salt. Additionally and essentially the composition will include a water-soluble substance which will form a film between the water-soluble, crystallizable salt and the particles of the organic colloid and which will act as a protective agent for the colloid to protect it from decomposition by or degrading action of the salt. The protective agent will be in minor proportion with respect to the salt.

More specifically the composition in accordance with this invention will desirably include the several ingredients in the proportion of 1.0–6.0 lbs. of crystallizable salt, 0.1–1.25 lbs. of organic colloid, to 0.1–1.0 lb. of protective agent.

The hygroscopic, non-deliquescent organic colloid included in the composition in accordance with this invention may, for example, be a starch, as cornstarch, natural substances containing high percentages of starch such as cereal flours, gelatin, agar-agar, ammoniacal casein, or other organic colloid capable of forming a gel in the presence of water, or a mixture thereof. Preferably, but not in any sense necessarily, the colloid will be a cornstarch containing up to 6% of naturally incrusted glutinous matter. The crystallizable salt component of the composition may, for example, be zinc chloride, magnesium chloride, calcium chloride, or other water-soluble, crystallizable salt, or mixtures thereof, capable of substantially lowering the freezing point of water.

Preferably, but not in any sense necessarily, calcium chloride will be used, more particularly because of its cheapness and efficiency.

The protective agent, as has been indicated, will be a water-soluble substance having the capacity to form a film between the salt and the colloid to protect the colloid ingredient from decomposition or degradation by the salt and may, for example, be a decomposition product of cornstarch, as dextrine, dextrose, glucose, corn sugar or the like; a higher polyhydric alcohol as sorbitol, mannitol and the like; a polyhydric alcohol, as glycerin, ethylene glycol, and propylene glycol; cane sugar, molasses, or other water-soluble substance having the indicated capacity to protect the colloid.

While in the absence of the protective agent organic colloids of the type indicated, such as starch, would suffer partial decomposition or degradation through the strong water absorbent influence of a deliquescent substance, like calcium chloride, within a few days, the protective agent in film form in the composition thus produced appears to afford sufficient protection against break-down of the colloid. In other words, there is no need to convert the composition into an aqueous solution immediately after its manufacture, and it may be stored for a long time in a dry place before being used for its ultimate purpose.

The composition thus produced will be in a non-fluid state despite the high water-absorbent power of the deliquescent salt.

The composition in the dry state is adaptable for various use, for example, in soil stabilization in connection with the construction of roadways, and the like, where it has proven its superiority to plain calcium chloride and to various other uses.

The composition as produced in the dry state may be admixed with water for the production of a solution of the water-soluble crystallizable salt and the colloid. The protective agent, since it is water-soluble, will dissolve and will not inhibit solution of the salt and the colloid. Such admixtures may be prepared to result in a final consistency of either a paste or a free-flowing liquid. The success of making them depends largely upon the amount of initial dissolution water used, and it is of general importance to say that it should never be more than the dissolution heat of the deliquescent salt can warm up to a temperature of at least 120 degrees Fahrenheit, unless it is desired to use artificial heat. For the preparation of free-flowing liquids dilution may begin after all ingredients are dissolved in the initial dissolution water. Solutions or admixtures of the composition according to this invention in water lend themselves for use advantageously in the treatment of coal for rendering it dustproof.

As more specifically illustrative of the composition in accordance with this invention, for example, a composition adaptable for use in the treatment of coal may be made up on the following formulae:

Formula A

| | Pounds |
|---|---|
| Calcium chloride (flake) | 87 |
| Cornstarch | 11 |
| Dextrine | 2 |

Formula B

| | Pounds |
|---|---|
| Calcium chloride (flake) | 91 |
| Cornstarch | 7.5 |
| Dextrine | 1.5 |

Formula C

| | Pounds |
|---|---|
| Calcium chloride (flake) | 86 |
| Cornflour | 8 |
| Dextrose solution 40° Baumé | 4 |

In preparing the composition on the above formulae, the calcium chloride may be moistened with water and the dextrine, or its equivalent, dusted on and the starch mixed or otherwise admixed with the thus coated calcium chloride. Again, the starch may be previously moistened and the dextrine dusted on or otherwise admixed with it and the thus treated starch admixed with the calcium chloride. Alternatively, the dextrine may be applied to the calcium chloride or to the starch in concentrated aqueous solution, say a 25% solution. As an alternative, concentrated calcium chloride liquor may be used instead of water to bind the protective agent and the film forming colloid to the calcium chloride.

In preparing compositions according to this invention where the protective agent is a solid the above procedure, outlined above with reference to dextrine, may be followed. Where the protective agent is a liquid, as a polyhydric alcohol, molasses, or the like, it may be mixed with the salt and the organic colloid, with dilution with water if necessary to uniform coating.

Where it is desired to produce a solution of the composition according to the above formula, such may be readily accomplished by admixing with from 10 to 18 gallons of water, approximately, until the mixture has become quite viscous, and finally adding sufficient water to make 45 gallons of solution.

The composition according to this invention in solution lends itself, as has been indicated, with exceptional advantage to the treatment of coal for rendering it dustless, preventing freezing, giving to the coal a desirable appearance and variously for other advantageous effects.

For the treatment of coal the coal will generally be treated in the form of free-flowing fragments or particles, usually of irregular form, and the treatment will generally be applied by spraying the composition on the fragments or particles of coal, it being noted that the composition in liquid form, for example, according to the above formula, will be of a viscosity such that it may be readily and economically sprayed on particles or fragments of coal in flow, for example, at the end of a loading boom. Some of the liquid compositions which can be prepared in accordance with this invention will upon prolonged standing become almost jelly-like in consistency. It has, however, been established that such compositions exhibit thixotropic qualities, which make it possible to again transform the jelly-like masses into fluid sprayable liquids by mixing motion, pumping, or similar agitation.

For the treatment of coal, the composition in accordance with this invention, more especially in liquid form, possesses the greatest advantage in that on application of the composition in liquid form to free-flowing fragments or particles of coal by spraying, the fragments or particles of coal become thoroughly coated. Subsequently the water, or the major part of the water, evaporates or is lost, with the result that the particles or fragments of coal are coated with a thin coat or film of water-soluble, crystallizable salt, and starch in a semi-dry state. The crystallizable salt attracts moisture from the atmosphere and maintains the coal moist and dustless. The starch operates to maintain the crystallizable salt in place on the coal and renders material assistance to the salt to collect any particles of dust which may be formed as the coal may be agitated in the mass in transfer, as, for example, in coal cars or in the chuting, or other transference of the coal.

The presence of the crystallizable salt in the film coating on the particles or fragments of coal will prevent the coal from freezing even at extremely low temperatures.

The composition according to this invention as prepared for the treatment of coal has the very great advantage of being non-inflammable. The composition as used in the treatment of coal affords no element of danger in the spraying operation and the composition is substantially non-corrosive and therefore will not injure coal handling machinery or metallic storage or transportation containers.

The composition according to this invention as produced in the non-fluid state, as described above, is possessed of the advantages of being substantially odorless, non-corrosive, non-inflammable and will remain permanently in a non-fluid state due to the fact that the protective agent forms a protective coating or film between the salt and the organic colloid which prevents the salt from exerting any degrading or decomposing action on the organic colloid.

In a semi-dry state, the composition is extremely sticky. For this reason, it will not easily penetrate into the interior of the coal particles to which it has been applied, but will remain indefinitely on the surface where a dust agglutinant of any description should remain in order to be of permanent efficiency.

Despite the permanency of its non-fluid state, the composition in accordance with this invention may be readily admixed with water, with the result that the water-soluble, crystallizable salt goes into solution in the water. The organic colloid is converted to the colloidal state and the protective agent is dissolved.

In the solid state, as has been indicated, the composition in accordance with this invention lends itself to use in soil stabilization, for example, in connection with the construction of highways. In such use the composition in a dry state is admixed with the various soils admixed for the formation of a stabilized mixture and in such a mixture acts to maintain the water or moisture balance.

In road stabilization work the composition can also be used to advantage in form of a paste formed by the addition of a small amount of water.

It will be appreciated that it is not intended to limit this invention to the details herein given by way of example and illustration, it being obvious that various modifications in the composition and method for its production may be made without departing from the scope of this invention. Further, it will be appreciated that the composition in accordance with this invention is adapted for various uses other than those more particularly mentioned herein.

What I claim and desire to protect by Letters Patent is:

1. A composition of matter in solid form comprising a solid, water-soluble deliquescent, crystallizable inorganic salt capable of lowering the freezing point of water, an organic hygroscopic, normally solid, non-deliquescent colloid, capable of forming a gel with water, in finely divide form, in admixture with the salt in minor proportion, and a water-soluble protective agent, capable of preventing degradation of the colloid by the salt, in minor proportion, the composition being characterized by the fact the the water-soluble salt and the colloid retain their solid form and that the protective agent forms a film between the particles of the colloid and the salt effective to prevent degradation of the colloid by the salt.

2. A composition of matter in solid form comprising a solid, water-soluble, deliquescent, crystallizable inorganic salt capable of lowering the freezing point of water, an organic hygroscopic, normally solid, non-deliquescent colloid, capable of forming a gel with water, in finely divided form, in admixture with the salt in minor proportion and a water-soluble decomposition product of cornstarch in minor proportion, the composition being characterized by the fact that the water-soluble salt and the colloid retain their solid form and that the decomposition product of cornstarch forms a film between the particles of the colloid and the salt.

3. A composition of matter in solid form comprising a solid, water-soluble, deliquescent, crystallizable inorganic salt capable of lowering the freezing point of water, a hygroscopic, normally solid, non-deliquescent colloid, capable of forming a gel with water, in finely divided form, in admixture with the salt in minor proportion, and a polyhydric alcohol from the group consisting of glycerine, ethylene glycol and propylene glycol in minor proportion, the composition being characterized by the fact that the water-soluble salt and the colloid retain their solid form and that the polyhydric alcohol forms a film between the particles of the colloid and the salt.

4. A composition of matter in solid form comprising a solid, water-soluble, deliquescent, crystallizable inorganic salt capable of lowering the freezing point of water, an organic hygroscopic, normally solid, non-deliquescent colloid, capable of forming a gel with water, in finely divided form, and a water-soluble protective agent, capable of preventing degradation of the colloid by the salt, in amounts on the ratio of about 1–6 pounds of salt to about 0.1–0.2 pound of organic colloid to about 0.1–1.0 pound of protective agent, the composition being characterized by the fact that the salt and the colloid retain their solid form and that the protective agent forms a film between the particles of the colloid and the salt effective to prevent degradation of the colloid by the salt.

5. A composition of matter in solid form comprising a solid, water-soluble, deliquescent, crystallizable inorganic salt capable of lowering the freezing point of water, an organic hygroscopic, normally solid, non-deliquescent colloid, capable of forming a gel with water, in finely divided form, and a water-soluble decomposition product of cornstarch, in amounts on the ratio of about 1–6 pounds of salt to about 0.1–0.2 pound of organic colloid to about 0.1–1.0 pound of decomposition product of cornstarch, the composition being characterized by the fact that the salt and colloid retain their solid form and that the decomposition product of cornstarch forms a film between the particles of the colloid and the salt.

6. A composition of matter in solid form comprising a solid, water-soluble, deliquescent, crystallizable inorganic salt capable of lowering the freezing point of water, a hygroscopic, normally solid, non-deliquescent colloid, capable of forming a gel with water, in finely divided form, and a polyhydric alcohol from the group consisting of glycerine, ethylene glycol and propylene glycol, in amounts on the ratio of about 1–6 pounds of salt to about 0.1–0.2 pound of organic colloid to about 0.1–1.0 pound of polyhydric alcohol, the composition being characterized by the fact that the water-soluble salt and the colloid retain their solid form and that the polyhydric alcohol forms a film between the particles of the colloid and the salt.

7. A composition of matter in solid form comprising a solid, water-soluble, deliquescent, crystallizable inorganic salt capable of lowering the freezing point of water, an organic hygroscopic, normally solid, non-deliquescent colloid, capable of forming a gel with water, in finely divided form, in admixture with the salt in minor proportion, and dextrine, in minor proportion, the composition being characterized by the fact that the water-soluble salt and the colloid retain their solid form and that the dextrine forms a film between the particles of the colloid and the salt.

8. A composition of matter in solid form comprising calcium chloride, cornstarch in finely divided state and dextrine in amounts on the ratio of about 86–91 pounds calcium chloride to about 7.5 pounds cornstarch to about 1.5–4.0 pounds dextrine, the composition being characterized by the fact that the calcium chloride and cornstarch retain their solid form and the dextrine forms a film between the particles of cornstarch and the calcium chloride.

9. A composition of matter in solid form having the following formula:

| | Per cent by weight |
|---|---|
| Calcium chloride (flake) | About 87 |
| Cornstarch (finely divided) | About 11 |
| Dextrine | About 2 | the composition being characterized by the fact that the calcium chloride and cornstarch retain their solid form and the dextrine forms a film between the particles of cornstarch and the calcium chloride.

10. A composition of matter in solid form comprising calcium chloride, an organic hygroscopic, normally solid, non-deliquescent colloid, capable of forming a gel with water, in finely divided form, in admixture with the salt in minor proportion, and a water-soluble protective agent, capable of preventing degradation of the colloid by the salt, in minor proportion, the composition being characterized by the fact that the water-soluble salt and the colloid retain their solid form and that the protective agent forms a film between the particles of the colloid and the salt effective to prevent degradation of the colloid by the salt.

WERNER E. KLEINICKE.

REFERENCES CITED

The following references are of record in the file of this patent:

UNITED STATES PATENTS

| Number | Name | Date |
|---|---|---|
| 2,116,682 | Kleinicke et al. | May 10, 1938 |
| 2,238,776 | Kleinicke | Apr. 15, 1941 |
| 2,250,287 | Work et al. | July 22, 1941 |
| 2,109,471 | Drew | Mar. 1, 1938 |

FOREIGN PATENTS

| Number | Country | Date |
|---|---|---|
| 475,709 | France | Mar. 20, 1915 |

OTHER REFERENCES

Condensed Chemical Dictionary, 3rd ed., 1942, page 683.